US006995821B1

(12) United States Patent
Lu et al.

(10) Patent No.: US 6,995,821 B1
(45) Date of Patent: Feb. 7, 2006

(54) METHODS OF REDUCING UNBALANCED DC VOLTAGE BETWEEN TWO ELECTRODES OF REFLECTIVE LIQUID CRYSTAL DISPLAY BY THIN FILM PASSIVATION

(75) Inventors: Minhua Lu, Mohegan Lake, NY (US); Robert L. Melcher, Mount Kisco, NY (US); Kei-Hsiung Yang, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/296,588

(22) Filed: Apr. 23, 1999

(51) Int. Cl.
*G02F 1/1335* (2006.01)
*G02F 1/1343* (2006.01)

(52) U.S. Cl. ........................ 349/113; 349/139; 349/147

(58) Field of Classification Search ................ 349/113, 349/139, 147
See application file for complete search history.

(56) References Cited

U.S. PATENT DOCUMENTS 4,084,986 A * 4/1978 Aoki et al. ................. 438/372
4,640,744 A * 2/1987 Howe ......................... 205/687
4,826,293 A * 5/1989 Grinberg et al. .............. 349/31
4,972,250 A * 11/1990 Omori et al. ............... 257/631
5,039,358 A * 8/1991 Birkle et al. ............... 148/33.3
5,250,451 A * 10/1993 Chouan ...................... 438/161
5,764,324 A * 6/1998 Lu et al. ..................... 349/113
5,978,058 A * 11/1999 Sung .......................... 349/139
5,990,988 A * 11/1999 Hanihara et al. ............. 349/48
6,061,114 A * 5/2000 Callegari et al. ........... 349/125
6,292,238 B1 * 9/2001 Okada et al. ................. 349/58
6,297,863 B1 * 10/2001 Yamaguchi et al. .......... 349/76
6,334,888 B1 * 1/2002 Collas et al. ................. 96/148
6,344,888 B2 * 2/2002 Yasukawa ................... 349/113

OTHER PUBLICATIONS

IBM J. Res. Develop. "Active-matrix display using ion-beam-processed polymide film for liquiid crystal alignment", Lien et al., vol. 42, No. 3/4, May/Jul. 1998, pp. 537-541.

* cited by examiner

*Primary Examiner*—Andrew Schechter
*Assistant Examiner*—Mike Qi
(74) *Attorney, Agent, or Firm*—Gibb I.P. Law Firm,LLC; Robert M. Trepp, Esq.

(57) ABSTRACT

A structure (and method) for a reflective-type liquid crystal display includes a first-type electrode, a second-type electrode positioned opposite the first-type electrode and being of an opposite type than the first-type electrode and a liquid crystal material between the first-type electrode and the second-type electrode, wherein at least one of the first-type electrode and the second-type electrode includes an amorphous layer adjacent the liquid crystal material.

20 Claims, 5 Drawing Sheets

Vcom shift vs. time of prior art light valves

Vcom shift with DLC film by different clean process

METHODS OF REDUCING UNBALANCED DC VOLTAGE BETWEEN TWO ELECTRODES OF REFLECTIVE LIQUID CRYSTAL DISPLAY BY THIN FILM PASSIVATION

BACKGROUND OF THE INVENTION

1. Field of the Invention

The present invention generally relates to a reflective liquid crystal cell driven by active matrices and more particularly relates to a reflective liquid crystal display driven by active matrices fabricated on either glass plates, Si-wafers or polymeric substrates.

2. Description of the Related Art

Conventional systems utilize transmissive and reflective active-matrix-driven liquid crystal displays (AMLCDs). The basic structure of AMLCDs is shown in FIG. 1 and generally includes polarizers 101 and 102 glass substrates 103 and 104, transparent conductive electrodes 105 and 106, color filters 108 (optional), on/off transistor switches 109, and an LC medium 110 sandwiched between two transparent conductive electrodes 105 and 106. A back-light source 107 illuminates the display panel from below. Alignment layers (not shown) such as rubbed polyimide films are typically disposed between the LC medium 110 and the transparent conductive electrodes 105 and 106.

For reflective AMLCDs with reflective electrodes built inside the LC cell, the transparent conductive electrode 106 is usually replaced by a reflective metal electrode which occupies a larger area to cover the transistor 109. Also for reflective AMLCDs, there is no need for the back-light source 107. Instead, ambient light or another light source illuminates the display panel from the top of FIG. 1. The transmissive-type AMLCD typically includes repetitive unit cells or picture elements (pels). FIG. 1 illustrates a 3 by 3 matrix of pels.

A schematic drawing of a pel is shown in FIG. 2, where the attached numbers have correspondingly the same meanings as in FIG. 1. The capacitor 111 denotes the capacitance of the LC medium 110 sandwiched between two transparent conductive electrodes 10S and 106, and capacitor 120 denotes the storage capacitor which provides a parallel capacitance to the LC capacitance 111 and is terminated on a line 121 common to all the storage capacitors in the display. An alternative design shown in FIG. 2 includes a storage capacitor 122 between the electrode 106 and the gate bus line 107.

When a voltage below a threshold voltage is applied to the gate line 107, the transistor 109 is in an off-condition so that the potential on the data bus line 108 and electrode 106 are isolated from one another. When a voltage larger than the threshold voltage is applied on the gate bus line 107, the transistor 109 is in an on-condition (low impedance state), thereby allowing the voltage on the data bus line 108 to charge the electrode 106. Varying the voltage to the electrode 106 controls the liquid crystal cell 111 such that different amounts of light are transmitted across the liquid crystal display, thus resulting in the display of a gray scale of light.

A reflective-type AMLCD is similar in structure to the transmissive-type AMLCD; however, the transparent electrode 106 is usually replaced with a reflective metal electrode which generally occupies a larger area to cover the transistor 109. Also for reflective-type AMLCDs, there is no need for the back-light source 107. Instead, ambient light or another light source illuminates the display panel from the top.

There are several materials such as indium oxide, tin oxide indium-tin oxide (ITO), zinc oxide, indium-zinc oxide (IZO) that can be used for the transparent electrodes of the transmissive-type and reflective-type AMLCDs. Indium-tin oxide is the preferred choice because it has good transparency in the visible light, suitable conductivity, and is inexpensive to manufacture. In the state-of-art transmissive-type AMLCD, both electrodes 105 and 106 are ITO, and rubbed polyimide (PI) films made of the same PI resin are on each ITO electrode to form LC alignment layers for the LC medium in the display.

In the polyimide-aligned liquid crystal display art, it is well-known that there is charge injection from the electrode into the adjacent aligning PI film such that the exact potential across the LC medium is determined by the applied voltage across the electrodes, the difference in surface potentials resulting from the charge injections into the aligning PI films from the adjacent electrodes, and the work-function difference between the opposite electrodes. In the case of transmissive-type AMLCD using the same ITO and PI on opposite sides of the LC medium, the differences in work function and surface potential are zero because of the symmetric arrangements of both the electrodes and alignment layers.

Therefore, the exact voltage drop across the LC medium is determined only by the applied voltage across the two display electrodes for the transmissive-type AMLCD, and is approximately equal to that of the applied voltage if the thickness of the aligning PI film is negligible compared to the thickness of the LC medium.

For the reflective-type AMLCD, there is usually a difference in work function between the transparent electrode, such as ITO with a work function about 4.7 eV, and the reflective electrode, such as Al with a work function ranging from 4.06 to 4.41 eV depending on the process conditions. Furthermore, it is very difficult to balance out this difference in work function across the whole display panel at a given time resulting in perceivable flicker on those unbalanced locations on the display.

In addition, the Al electrode is more reactive to the adjacent PI film than ITO electrode in terms of charge injection into the PI films, resulting in a substantial difference in surface potentials on the PI-to-LC interfaces situated at opposite sides of the LC medium of a reflective-type AMLCD. This net surface-potential difference is not uniform across the display panel, not stable under light illumination electrical driving, and temperature variation. As a result, there exists a time-varying DC field across the LC medium in the LC cell even if the voltage applied across the two electrodes of the LC display is AC, that is, lacking a DC component.

This DC field can be reduced to zero by applying a suitable DC voltage defined as "Vcom shift" on the ITO (or common) electrode of the LC display. The "Vcom shift" not only changes with time at each location, but also varies among different locations at the same time, resulting in a flickering display if it is driven by the frame-inversion method (e.g., with a frame rate lower than about 70 Hz). The larger the Vcom shift, the higher the frame rate required to avoid flickers.

Due to the spatial variation and temporal drift of this "Vcom shift", a flickerless display can only be achieved by driving the display with column-inversion methods at a frame rate higher than about 70 Hz, resulting in lower brightness and larger power-consumption than if the display had been driven by the frame-inversion method. A stable and uniform "Vcom shift" across the whole display panel is a necessary condition to achieve flickerless display with lower power consumption and higher brightness.

SUMMARY OF THE INVENTION

It is, therefore, an object of the present invention to provide a structure and method for a reflective-type liquid crystal display that includes a first-type electrode, a second-type electrode positioned opposite the first-type electrode and being of an opposite type than the first-type electrode and a liquid crystal material between the first-type electrode and the second-type electrode, wherein at least one of the first-type electrode and the second-type electrode includes an amorphous layer adjacent the liquid crystal material.

The first-type electrode and the second-type electrode alternately comprise a transmissive-type electrode or a reflective-type electrode. The amorphous layer is a hydrogenated amorphous carbon silicon, germanium. $SiO_2$, $Si_3N_4$ or $TiO_2$. The amorphous layer has a unidirectional orientation matched to the liquid crystal material.

The reflective-type liquid crystal display may also include a polyimide layer, polyamide layer or oblique-evaporated inorganic layer between the amorphous layer and the liquid crystal material. A voltage between the first-type electrode and the reflective electrode varies a transparency of the liquid crystal material. The amorphous layer is a passivation layer.

The invention also includes a reflective-type liquid crystal display that includes a transmissive electrode, a reflective electrode positioned opposite the transmissive electrode and a liquid crystal material between the transmissive electrode and the reflective electrode, wherein at least one of the transmissive electrode and the reflective electrode includes an amorphous carbon layer adjacent the liquid crystal material.

The transmissive electrode comprises indium tin oxide and the reflective-type electrode comprises aluminum. The amorphous carbon layer comprises hydrogenated amorphous carbon silicon, germanium, $SiO_2$, $Si_3N_4$ or $TiO_2$. The amorphous carbon layer has a unidirectional orientation matched to the liquid crystal material.

The reflective-type liquid crystal display may further include a polyimide layer, polyamide layer or oblique-evaporated inorganic layer between the amorphous carbon layer and the liquid crystal material. A voltage between the transmissive electrode and the reflective electrode varies a transparency of the liquid crystal material. The amorphous carbon layer is a passivation layer.

The invention also includes a method of forming a reflective-type liquid crystal display that comprises forming a first-type electrode, forming a second-type electrode positioned opposite the first-type electrode and being of an opposite type than the first-type electrode, forming a liquid crystal material between the first-type electrode and the second-type electrode, and forming an amorphous layer on at least one of the first-type electrode and the second-type electrode adjacent the liquid crystal material.

The forming of the first-type electrode and the second-type electrode alternately comprise forming a transmissive-type electrode and a reflective-type electrode. The forming of the amorphous layer comprises forming one of a hydrogenated amorphous carbon silicon, germanium, $SiO_2$, $Si_3N_4$ and $TiO_2$ layer. The method also includes forming the amorphous layer to have a unidirectional orientation matched to the liquid crystal material.

The method may also include forming one of a polyimide layer, polyamide layer and oblique-evaporated inorganic layer between the amorphous layer and the liquid crystal material. A voltage between the first-type electrode and the reflective electrode varies a transparency of the liquid crystal material.

The present invention comprises a reflective-type AMLCD with no perceivable flicker even when it is operated with the frame-inversion drive with a frame rate lower than about 70 Hz. This disclosure describes a method of using a slightly conducting thin film coated on both the transmissive and reflective electrodes of reflective-type LCD as a passivation layer to achieve a small and stable uniform Vcom shift across the whole display panel. The thin and slightly conducting film can allow electrical charges to flow across itself as well as substantially balance out the differences in work functions and surface potentials between opposite sides of the LC medium of reflective-type AMLCDs to achieve a stable and uniform Vcom shift. This slightly conducting passivation layer has a resistivity sufficiently high to not produce shorts between the pixel electrodes of the pixelated reflective-type AMLCD so that no further processes are necessary after it is deposited on the electrodes. Further, it is simple and inexpensive to fabricate such a passivation layer on the electrodes of reflective-type AMLCD to obtain flickerless displays with high brightness and low cost.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 2:
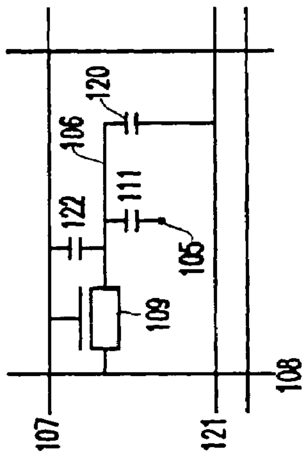
FIG. 2 is a schematic diagram of a picture element (pel) of an AMLCD.

As mentioned above, the invention solves the flickering problem that occurs when using frame-inversion methods with rates of 70 Hz or less on reflective-type AMLCDs. The invention produces a flickerless display even using frame-inversion method with rates of 70 Hz or less.

In order to characterize the flickering nature of the reflective-type AMLCD, the inventors setup experiments to measure the so called "Vcom shift" of the reflective LC cell. For this purpose, the inventors constructed a test LC cell illustrated in FIG. 3 which includes a transparent substrate 202 made of a glass plate, an ITO layer 204 (having a thickness of about 130 nm) on the substrate 202, a polyimide layer 206 (having a thickness of about 100 nm and comprising AL3046 plyimide resin from Japan Synthetic Rubber Co., Tokyo, Japan), an LC medium 200 (comprising TL.215 from Merck Inc., Darnstadt, Germany), another PI alignment layer 216 (having a thickness of about 100 nm and also being made of AL3046 plyimide resin from Japan Synthetic Rubber Co.), a reflective Al electrode 214 (having a thickness of about 150 nm) on a silicon substrate 212.

Figure 3:
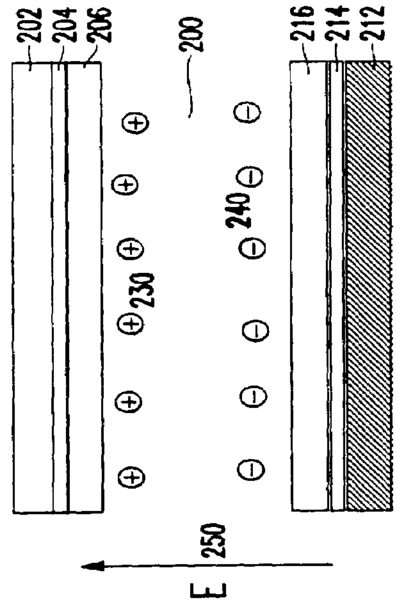
FIG. 3 is a schematic illustration of the structure of a reflective LC cell for the measurement of "Vcom shift" of the display and for an explanation of Vcom shift.

The inventors then measured the Vcom shift of the LC cell shown in FIG. 3 as a function of time. For the measurement of the Vcom shift, a reflective 45°-twist cell was fabricated with a cell gap, d, satisfying the relation $d\Delta n$ about 0.9 to 1.05 mm, where $\Delta n$ is the birefringence of the LC medium used in the test cell.

The test cell was placed on a microscope with the reflected light from the microscope being detected by a photodiode which was connected to an oscilloscope. A 30 Hz square wave with an amplitude about 2 V was applied to the Al electrode 214 and a variable DC voltage source was connected to the ITO electrode 204 of the test cell. The DC voltage was then adjusted in such a way to equalize the electro-optical response of the test cell between the positive- and negative-voltage cycles shown on the oscilloscope.

Figure 4:
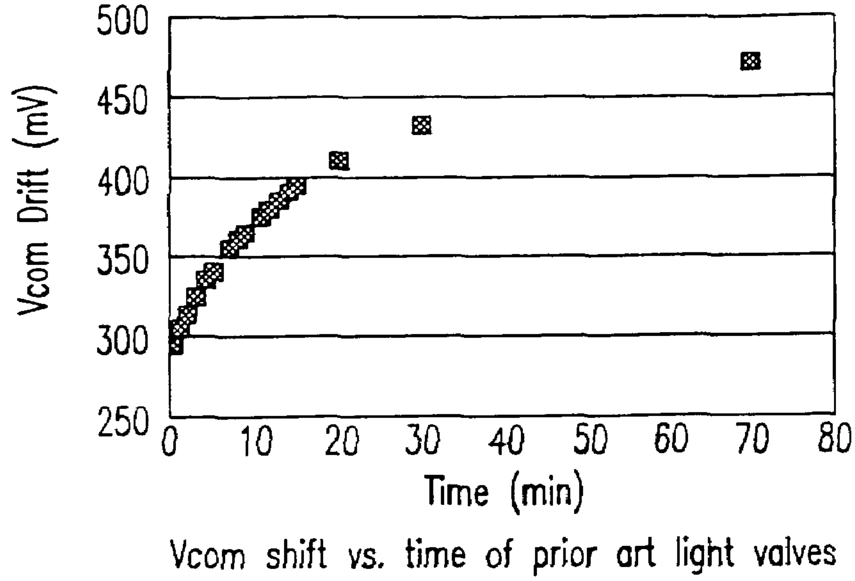
FIG. 4 shows the experimental results of measured Vcom shift as a function of time based on the test cell whose structure is shown in FIG. 3.

The result of this DC voltage was the data of "Vcom shift" at that time. The inventors measured the Vcom shift as a function of time and the results are shown in FIG. 4 which indicates that the measured values of Vcom shift increased from about 300 mV to about 470 mV within about 70 minutes. Experimentally, the inventors also confirmed that the Vcom shift for bare Al and bare ITO cell was about 800–900 mV.

With polyimide alignment layers, the Vcom shift, in general, varied from 200 to 800 mV within an hour. In both cases, the Vcom shift was not steady but drifted over time when the display was driven by an AC voltage simulating the waveform of frame-inversion drive.

The inventors tried to use a thick dielectric film, such as a 100 nm thick SiO, or $SiN_x$, to passivate the electrodes. However, even with such dielectric film, the Vcom shift was substantial and also varied significantly as a function of time.

The mechanisms responsible for the existence of Vcom shift and its drift over time are very complicated and not well-understood. However one can reason and explanation from the point of view of ion migration and charge trapping and release on the two interfaces between the LC medium and the alignment layers which are fabricated on surfaces of the electrodes. For example, assuming that there are positive ions 230 and negative ions 240 within the LC medium 200, as shown in FIG. 3, and the charge densities are n+ and n-, respectively. The electric field 250 applied on the LC medium drives the positive ions 230 onto the surface of PI alignment layer 206 which traps some of the positive ions 230. At the same time, the electric field 250 drives negative ions 240 onto the surface of PI alignment layer 216 which traps some of the negative ions 240. When the polarity of the electric field 250 is reversed, the polarities of trapped charges on the PI surfaces is also reversed. In the case that there is a difference in the densities of trapped charges for either positive or negative ions on the surfaces of PI 206 and 216, and a finite Vcom shift between the electrodes charge-trapping densities on the surfaces of PI alignment layers 206 and 216 may vary with temperature and/or illumination resulting in the drift of Vcom shift accordingly.

This large change on Vcom shift over time results in a flickering display under frame-inversion drive at a frame rate below about 70 Hz unless real-time adjustments of the DC voltages are applied to the ITO (common) electrode to counterbalance this varying Vcom shift. Expensive mechanisms are required to implement such real-time adjustment of DC bias voltage on the common ITO electrode.

In addition, if the Vcom shift not only varies over time but is also not uniform across the display panel, the real-time adjustments of the DC voltage on the common ITO electrode can only balance the Vcom shift for certain locations of the display and not for the whole display, resulting in certain portions of the display producing more flickering than the rest of the display.

Transmissive-type AMLCDs have a stable and negligible Vcom shift due to the symmetric structure of using the same ITO and PI film on opposite sides of the LC medium. Similar result can be achieved on reflective-type AMLCDs by coating a ITO layer on top of the reflective Al electrode prior to the coating of the PI film for the alignment layer as revealed by Yang and Lu, U.S. Pat. No. 5,764,324 (Jun. 9, 1998), incorporated herein by reference. However, because of the conductive nature of the ITO film, it is necessary to further process the ITO-coated Al electrode to form a pixelated display. The process of ITO on Al to from pixelated display is tedious and expensive.

The invention avoids these problems by using a slightly conducting thin film, e.g., diamond-like conducting (DLC) film, coated on both the Al and ITO electrodes of reflective LCDs to reduce and stabilize the Vcom shift.

The thin and slightly conducting film allows electrical charges to flow toward the electrodes and bend the Fermi level of the adjacent electrode and balance the surface potential. However, the inventive DLC film has a sufficiently high resistivity so as to not produce shorts between pixel electrodes of a pixelated reflective-type AMLCD. Thus, with the invention, the Vcom shift is small and stable so that the display can be operated in the frame-inversion drive with a frame rate lower than 70 Hz without perceivable flicker.

For example, the invention is very useful with Si-wafer based reflective-type AMLCDs such as those used in virtual and helmet-mounted displays. The DLC-passivated and -aligned reflective-type AMLCDs have several advantages when compared to conventional polyimide-aligned LC displays. For example, with the invention, there is no perceivable flicker even when the display is operated using frame-inversion-drive at a frame rate lower than 70 Hz. Further, the invention has lower power consumption because the display is driven with frame-inversion at low frequencies which allows lower voltage drivers to be used for the display. Because the voltage drop across the DLC film is much lower than that of PI film low-cost CMOS processes for active substrates may be used. Also, with the invention, no extra mechanism is required to detect the Vcom shift in real time to provide feedback for the adjustment of Vcom voltage to minimize the flicker. These advantages are relatively the same for monochrome or color reflective-type AMLCD using color filters or field sequential operation.

Figure 5A:
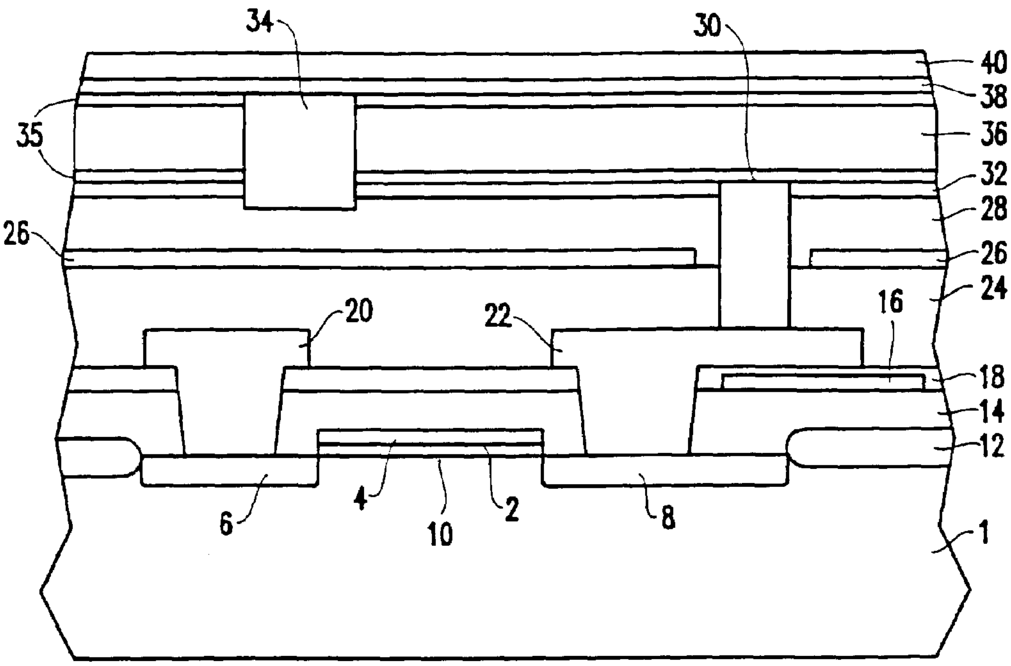
FIG. 5A is a schematic cross-sectional view of a sub-pixel of the reflective-type AMLCD.

Referring now to FIG. 5A, there is shown an example of the structure of a reflective-type AMLCD embodying the subject invention. It should be noted that the invention is not limited to the particular structure of the reflective-type AMLCD shown in the attached drawings, but instead, as would be known by one ordinarily skilled in the art, the invention is applicable with slight modification to any type of similar display device.

The exemplary reflective-type AMLCD shown in FIG. 5A includes a field effect transistor (FET) that is formed in each of a plurality of regions defined by field oxide films 12 on a semiconductor substrate 1 (for example, a silicon substrate).

The FET can have, but is not limited to, the following configuration. A gate insulating film 2 (for example. $SiO_2$, $Si_3N_4$ etc. 150 to 500 angstrom in thickness) is formed on a silicon substrate 1, and a gate electrode 4 (e.g., polysilicon, metal, alloy, etc.) is formed on the gate insulating film 2. A drain region 6 and a source region 8 are formed by diffusing or implanting an impurity such as bozons, phosphors in the silicon substrate 1 on both sides of the gate electrode 4. A channel region 10 is below the gate electrode 4.

A storage capacity line 16 is formed over an insulator 14 (e.g., a silicone oxide film, silicon nitride film etc.). A data line 20 and a source line 22 both comprising a suitable conductor (e.g., aluminum, polysilicon, metal, alloy, etc.) are formed on inter-layer insulating films 14, 18. The data line 20 is connected to the drain region 6 of the FET, and the source electrode 22 is connected to the source region 8.

An optical absorbing layer 26 is then formed over an inter-layer insulating film 24 (e.g., silicon oxide, silicon nitride, etc.). The optical absorbing layer 26 preferably has a thickness of 160 nm and comprises a titanium (Ti) layer 100 angstrom in thickness, an Al layer 1,000 angstrom in thickness, and a titanium nitride (TiN) layer 500 angstrom in thickness, laminated in this order. Laminating the materials so as to provide the above thickness can prevent light entering the optical absorbing layer 26 (e.g., the wavelength: 380 to 700 angstroms) from reflecting (to obtain a reflection factor of 25%) and from being transmitted to the FET (to obtain a transmission factor of 0%). The optical absorbing layer 26 is not limited to the foregoing structure but, as would be known by one ordinarily skilled in the art given this disclosure, could comprise any similarly functioning structure. The optical absorbing layer 26 serves to improve the contrast of images and to prevent leakage currents in the FET.

Then an insulating film 28 (e.g. silicon nitride having a thickness of 400 to 500 nm) is formed on the optical absorbing layer 26, and a light reflecting film 32 (Al, Al doped with Cu, etc. having a thickness of approximately 150 nm) is formed on the insulating film 28. The source electrode 22 of the FET and the light reflecting film 32 are connected together using, for example, a conductive stud 30 (e.g., tungsten (W) formed by a chemical vapor deposition (CVD) method in a through hole). The conductive stud 30 penetrates both the silicon oxide film 24 and the silicon nitride film 28. The optical absorbing layer 26 is opened around the tungsten stud 30 so as not to be connected electrically thereto.

Figure 5B:
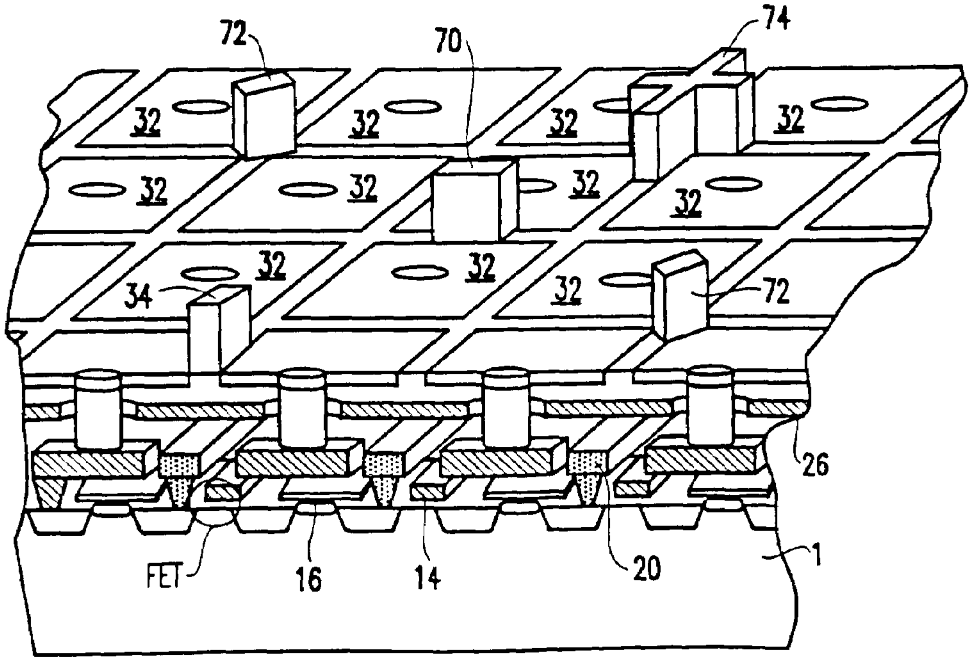
FIG. 5B is a schematic illustration of a matrix of pels of the reflective-type AMLCD.

The light reflecting film 32 is separate for each of a plurality of FETs, and each single light reflecting film 32 constitutes a single subpixel. The light reflecting films 32 are spaced apart at a specified interval (e.g., about 0.5 to 1.7 microns) and pillar-shape spacers 34 (e.g., $SiO_2$, $Si_3N_4$, polymeric material, etc. pillars) are formed to have a thickness (e.g., height) that is determined according to the desired cell gaps (e.g., 1 to 5 microns). The "cell gap" is defined as the distance between the reflecting films 32 and the opposing transparent electrode 38. As shown in FIG. 5B, the spacers 34 are located between the light reflecting films 32 in such a way that the spacers 34 do not rest on the films 32 and have a width almost equal to the distance between the light reflecting films 32. This prevents the numerical aperture of the subpixel from decreasing due to the pillar-shaped spacers 34. A plurality of the spacers 34 are provided throughout the substrate at a specified interval to retain predetermined cell gaps.

A transparent electrode 38 is formed on a transparent protective substrate 40 (e.g., glass, plastic plates or plastic films, etc. substrate). The transparent electrode 38 preferably comprises indium tin oxide (ITO) but could comprise any of the transparent electrodes mentioned above.

One or both of the electrodes 32 and 38 are coated with an amorphous material 35 carbon film or diamond-like carbon (DLC) film which can be any material, such as hydrogenated amorphous carbon, silicon, or germanium, $SiO_2$, $Si_3N_4$ or $TiO_2$ deposited, for example, by low-power (about 10 $mW/cm^2$) and low pressure (about a few pascals) plasma-enhanced chemical vapor depositions (PECVD) or sputtering.

Before coating, the exposed electrodes 32, 38 are subjected to cleaning procedures. For example, the electrodes 32, 38 are cleaned using an ultrasound bath containing detergent dissolved in deionized water, rinse with deionized waster, then baked in an oven. Then, the structure is loaded into a plasma-generating chamber and held at a temperature from 20° C. to about 250° C. during the DLC film deposition. The DLC film 35 is deposited in a mixture of either $CH_4$ or $C_2H_2$ with either 2% He or 2% Ar at a pressure of a few pascals. To minimize plasma-generated damage, the rf power density to generate plasma is held to about 5 $mW/Cm^2$ to achieve a deposition rate of about 3 nm per minute.

The total thickness of the DLC film 35 is about 5 nm and the resistivity is from 104 to 1011 ohm-cm. The DLC film can then be either buffed by a rotating wheel wrapped by a velvet or nylon cloth or treated by Ar ion beam as described in S.-C. A. Lien, P. Chaudhri, J. A. Lacy, R. A. John, and J. L. Speidell, "Active-matrix Display Using Ion-Beam-Processed Polyimide Film for Liquid Crystal Alignment" IBM Jour. of Res. & Develop. V42, 537–542 (May/July, 1998), incorporated herein by reference, to introduce a preferred orientation for the liquid crystal alignment.

The transparent electrode layer 38 is attached to the pillar-shape spacers 34 using any of a number of well-known, common adhesives such as adhesives from Three Bond International, Inc., forming a void 36 between the light reflecting film 32 and the opposite electrode 38.

The structure is then assembled to form completed reflective LC cells. A LC mixture, such as TL215 from EM Merck can then be vacuum injected into the LC cell and the injection hole should then be sealed with epoxy or UV-sensitive resin. The liquid crystal molecules 36 are preferably oriented by an orienting film, as is well known to those ordinarily skilled in the art.

FIG. 5B is a perspective illustration of a matrix of such pels for a reflective-type AMLCD. As shown, the pillar-shape spacers 34 are formed in the regions between the light reflecting films 32 at a specified interval. The spacers 34 can take many shapes and be positioned at many locations as illustrated by spacers 70, 72 and 74. In this embodiment, each light reflecting film 32 comprises a subpixel formed as a square with each side being equal (e.g. 17 microns) in length. The subpixels are preferably arranged in a matrix of rows and columns as shown. For example, the sub-pixels may be arranged in a matrix of 1,280 rows and 1,600 columns.

The reflecting film 32 of the reflective-type AMLCD reflects light entering from the transparent protective substrate 40 and also functions as a display electrode for supplying voltage to the liquid crystal layer 36. The FET functions as a switching element for applying a signal voltage from the data line 20 to the light reflecting film 32 (e.g., the display electrode), when the gate 4 is turned on.

The structure operates by allowing light entering from the transparent substrate 40 to travel through to the light reflecting film 32 and then to exit the transparent substrate 40 by means of reflection. Alternatively, the light is prevented from passing through the liquid crystal material 36 (e.g. by varying the direction of liquid crystal molecules) by changing the voltage applied between the light reflecting film 32 (acting as a display electrode) and the opposing electrode 38 (when the FET is turned on), thereby changing the light transmission factor.

Figure 1:
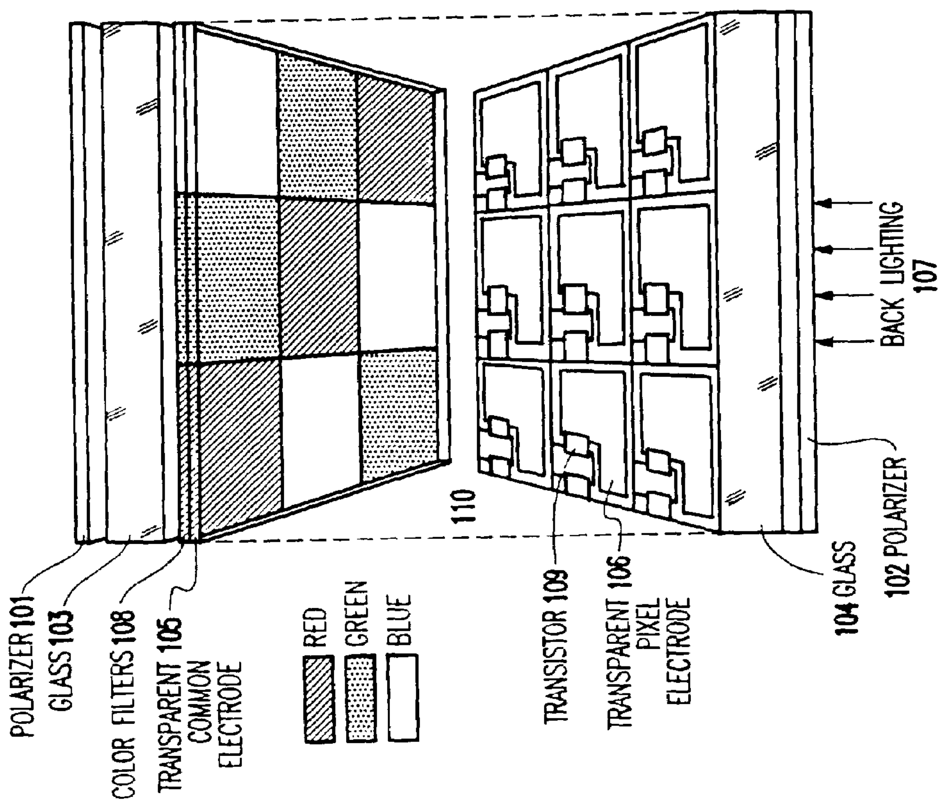
FIG. 1 is a schematic illustration of a transmissive-type AMLCD.

Although, as discussed above, there are several material such as indium oxide, zinc oxide, tin oxide, indium-zinc oxide (IZO), and indium-tin oxide (ITO) that can be used for the transparent electrodes 105 and 106 in FIG. 1 and electrode 38 in FIG. 5A, for either transmissive or reflective AMLCDs, ITO is a preferred choice because it has good transparency in the visible light, suitable conductivity, and is inexpensive to manufacture.

However, for reflective AMLCDs with a reflector built into the LC cell, such as the structure shown in FIG. 5A, at least one electrode must be reflective and the other electrode must be transparent or partially transparent in the visible region. There is no single material which can be used for both the transparent and reflective electrodes to achieve the symmetry that is found with transmissive AMLCDs. For reflective AMLCDs, indium-tin oxide is a preferred choice For the transparent electrode 105 and aluminum or silver (or one of their alloys) is a preferred choice for the reflective electrode (e.g., electrode 106 in FIG. 1 and electrode 38 in FIG. 5A).

With reflective AMLCDs the transparent ITO electrodes is replaced by, for example, a reflective Al electrode, which causes the Vcom shift to become substantial and non-uniform across the display panel (and to drift over time) which results in perceivable flicker at some locations of the display.

The invention uses the amorphous carbon film or diamond-like carbon film 35 to passivate both the electrode 38 and the pixel electrode 32 of a reflective-type AMLCD shown in FIG. 5A which makes the Vcom shift uniformly small across the display panel and stable over time under different operating conditions.

The inventors measured the Vcom shift of the inventive reflective LC display as a function of time. For the measurement of Vcom shift, a reflective 45°-twist cell was fabricated with a cell gap, d, satisfying the relation Δn about 0.9 to 1.05 μm, where Δn is the birefringence of the LC mixture. The display was placed on a microscope using blue light for illumination with the reflected light from the microscope detected by a photodiode which was connected to an oscilloscope. To simulate the frame-inversion drive at a frame rate of 60 Hz, a 30 Hz square wave with an amplitude about 2 V was applied to the Al electrode and a variable DC voltage source was connected to the ITO electrode of the reflective-type LC cell. The DC voltage was then adjusted in such a way to equalize the electro-optical response of the reflective-type LC cell between the positive- and negative-voltage cycles shown on the oscilloscope. The result of this DC voltage was the data of Vcom shift at that time.

Figure 6:
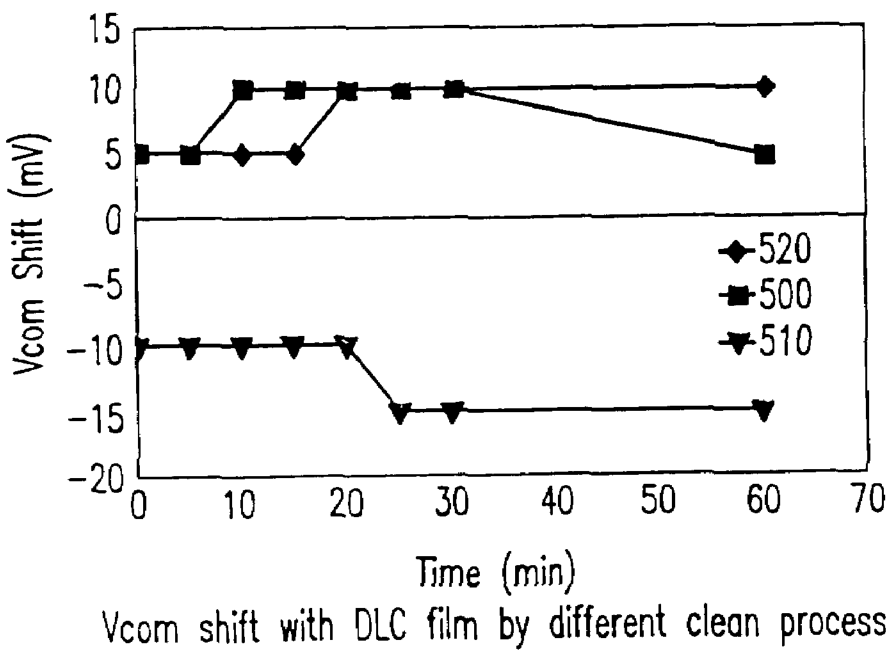
FIG. 6 is a chart showing the measured Vcom shift of a reflective-type LC cell with DLC film as both passivation and alignment layer.

The inventors measured the Vcom shift as a function of time and the results are shown in FIG. 6. More specifically, FIG. 6 shows that, with the inventive DLC film 35, the measured values of Vcom shift were small and there was negligible drift on Vcom shift over 60 minutes. Furthermore the measured Vcom shift as a function of time is insensitive to different cell-processing conditions as exhibited in FIG. 6, where the curves 500, 510, and 520 represent the cases of washing the DLC-film passivated substrates by de-ionized water, by iso-propyl-alcohol, and none, respectively, before the assembly of LC cells.

These small values of Vcom shift indicate that the DLC film 35 passivates both the Al and ITO electrodes to approximately equalize the sum of work function and the surface potential on the opposite sides of the LC medium within the LC cell. The steady Vcom shift over time implies that the imbalance of charges trapped on the two interfaces between the LC medium and the DLC-passivated electrodes are small and do not vary. In addition, this imbalance of trapped charges generated less field (or equivalently less flicker) within the LC medium due to the extremely thin DLC film (about 5 nm) as compared to a much thicker polyimide film (about 70 nm) that is commonly used for the alignment of conventional reflective-type liquid crystal displays.

These results were verified by a DC bias study which showed that the electric field generated by ions accumulated across the DLC-film-passivated reflective LC cell was about one order of magnitude smaller than the case of polyimide-aligned cell without DLC-film 35 passivation. There exists the possibility that slightly conductive thin DLC film might trap less charges on its interface adjacent to the LC medium.

Figure 9:
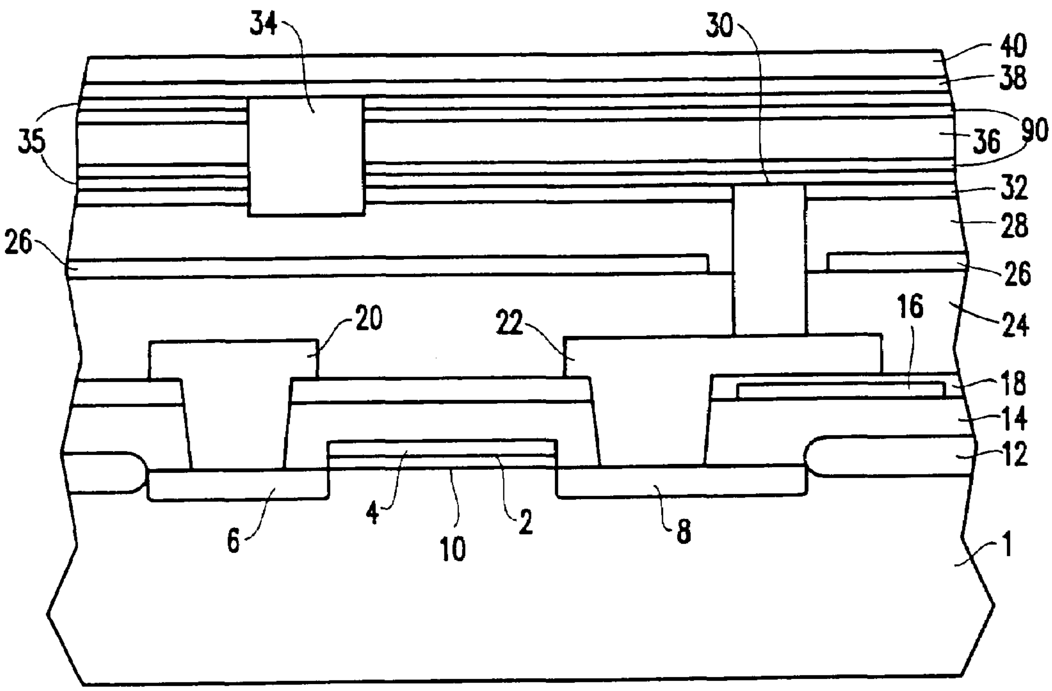
FIG. 9 is a schematic cross-sectional view of a sub-pixel of the reflective-type AMLCD.

A second embodiment of the invention is similar to the first embodiment in the preparation of DLC film 35 to passivate the transparent and reflective electrodes of reflective-type AMLCD. However, in the second embodiment, as shown in FIG. 9, after the deposition of the DLC films 35 on the electrodes 32, 38, a thin polyimide or polyamide film 90 with a thickness from 5 to 100 nm is deposited on top of the DLC films 35 to serve as the orientation film for the adjacent liquid crystal molecules.

The process procedures to form such polyimide or polyamide films 90 are well known to those ordinarily skilled in the art. For example, in a sequence of, off-set printing or spin-coating the polyimide or polyamide films 90 are deposited. The AMLCD structure can be prebaked at 80 to 85° C. for about 10 minutes, and finally baked at about 180° C. for about one hour. The polyimide or polyamide films 90 are then subjected to directional buffings under a rotating wheel wrapped by a velvet or nylon cloth forced to contact the underneath polyimide or polyamide films.

Figure 7:
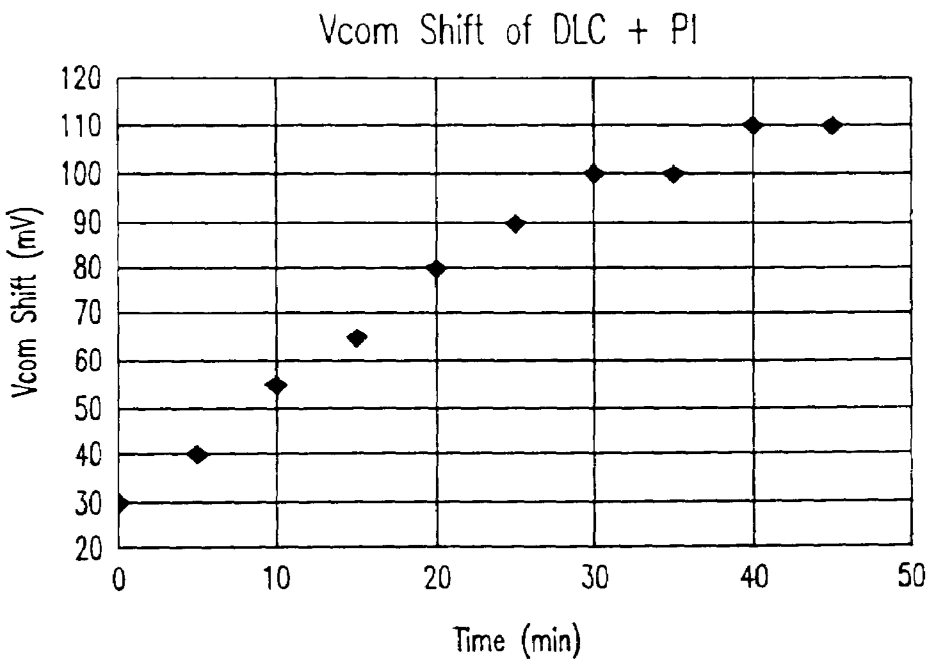
FIG. 7 is a chart showing the measured Vcom shift of a reflective-type LC cell with DLC film as a passivation layer and rubbed polyimide as an alignment layer.
Figure 8:
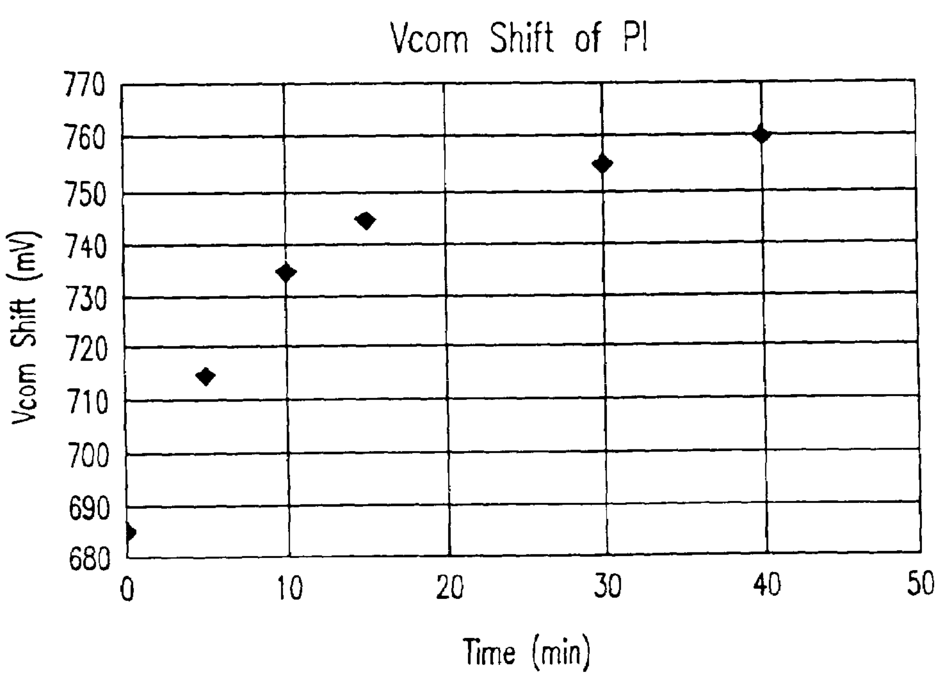
FIG. 8 is a chart showing the measured Vcom shift of a reflective-type LC cell with rubbed polyimide only, where the polyimide is same as FIG. 7.

FIG. 7 is a graph showing measured Vcom shift as function of time for a reflective display with a DLC film as passivation layer and a rubbed polyimide as alignment layer. FIG. 7 shows that the Vcom at time zero is almost zero compared to the 600 m V of same polyimide film without DLC passivation that is shown in FIG. 8. The drift in Vcom over time shown in FIGS. 7 and 8 is due to polyimide itself. In this second embodiment, the DLC films 35 serve only as a passivation film, and the polyimide or polyamide film 90 on top of the DLC film 35 is used to align the liquid crystal molecules to lower the processing costs. As would be known by one ordinarily skilled in the art given this disclosure, the type of film used for the alignment layer 90 is not limited to polyimide or polyamide films and but could be any type of oblique-evaporated inorganic films, such as SiOx or $MgF_2$, to properly function as the alignment layer for the LC displays.

Thus, the inventive flicker-free reflective-type liquid crystal display is formed by depositing an amorphous passivation layer on the electrodes of the reflective-type liquid crystal displays. The passivation layer has a thickness from 1 to 100 nm with a resistivity from 104 to 1011 ohm-cm, and is deposited by low-power plasma-enhanced vapor deposition methods. The passivation layer can also serve as an alignment layer for unidirectional alignment of liquid crystal molecules.

As mentioned above, with the inventive DLC layer 35, the Vcom shift is small and stable so that the display can be operated in the frame-inversion drive with a frame rate lower than 70 Hz without perceivable flicker. Further, the invention has lower power consumption because the display is driven with frame-inversion at low frequencies which allows lower voltage drivers to be used for the display. Because the voltage drop across the DLC film is much lower than that of PI film, low-cost CMOS processes for active substrates may be used. Also, with the invention, no extra mechanism is required to detect the Vcom shift in real time to provide feedback for the adjustment of Vcom voltage to minimize the flicker.

While the invention has been described in terms of preferred embodiments, those skilled in the art will recognize that the invention can be practiced with modification within the spirit and scope of the appended claims.

What is claimed is:

1. A reflective-type liquid crystal display comprising:

a first-type electrode;

a second-type electrode positioned opposite said first-type electrode and being of an opposite type than said first-type electrode; and a liquid crystal material between said first-type electrode and said second-type electrode, wherein at least one of said first-type electrode and said second-type electrode includes an amorphous carbon-containing layer adjacent said liquid crystal material, wherein said amorphous carbon-containing layer provides a level of conductivity corresponding to a resistivity between $10^4$ and $10^{11}$ ohms-cm.

2. The reflective-type liquid crystal display in claim 1, wherein said first-type electrode comprises a transmissive-type electrode and said second-type electrode comprises a reflective-type electrode.

3. The reflective-type liquid crystal display in claim 1, wherein said amorphous carbon-containing layer has a unidirectional orientation matched to said liquid crystal material.

4. The reflective-type liquid crystal display in claim 1, further comprising one of a polyimide layer, polyamide layer and oblique-evaporated inorganic layer between said amorphous carbon-containing layer and said liquid crystal material.

5. The reflective-type liquid crystal display in claim 1, wherein a voltage between said first-type electrode and said reflective electrode varies a transparency of said liquid crystal material.

6. The reflective-type liquid crystal display in claim 1, wherein said amorphous carbon-containing layer comprises a passivation layer.

7. A reflective-type liquid crystal display comprising:

a first-type electrode;

a second-type electrode positioned opposite said first-type electrode and being of an opposite type than said first-type electrode; and a liquid crystal material between said first-type electrode and said second-type electrode, wherein at least one of said first-type electrode and said second-type electrode includes an amorphous carbon-containing layer adjacent said liquid crystal material, wherein said amorphous carbon-containing layer provides a level of conductivity corresponding to a resistivity between $10^4$ and $10^{11}$ ohms-cm, and wherein said amorphous carbon-containing layer comprises one of a hydrogenated amorphous carbon silicon, germanium, $SiO_2$, $Si_3N_4$ and $TiO_2$.

8. A reflective-type liquid crystal display comprising:

a transmissive electrode;

a reflective electrode positioned opposite said transmissive electrode; and a liquid crystal material between said transmissive electrode and said reflective electrode, wherein at least one of said transmissive electrode and said reflective electrode includes a diamond-like amorphous carbon layer adjacent said liquid crystal material, wherein said diamond-like amorphous carbon layer provides a level of conductivity corresponding to a resistivity between 104 and $10^{11}$ ohms-cm.

9. The reflective-type liquid crystal display in claim 8, wherein said transmissive electrode comprises indium tin oxide and said reflective-type electrode comprises aluminum.

10. The reflective-type liquid crystal display in claim 8, wherein said amorphous carbon layer has a unidirectional orientation matched to said liquid crystal material.

11. The reflective-type liquid crystal display in claim 8, further comprising one of a polyimide layer, polyamide layer and oblique-evaporated inorganic layer between said amorphous carbon layer and said liquid crystal material.

12. The reflective-type liquid crystal display in claim 8, wherein a voltage between said transmissive electrode and said reflective electrode varies a transparency of said liquid crystal material.

13. The reflective-type liquid crystal display in claim 8, wherein said amorphous carbon layer comprises a passivation layer.

14. A reflective-type liquid crystal display comprising:

a transmissive electrode;

a reflective electrode positioned opposite said transmissive electrode; and a liquid crystal material between said transmissive electrode and said reflective electrode, wherein at least one of said transmissive electrode and said reflective electrode includes a diamond-like amorphous carbon layer adjacent said liquid crystal material, wherein said diamond-like amorphous carbon layer provides a level of conductivity corresponding to a resistivity between $10^4$ and $10^{11}$ ohms-cm, and wherein said amorphous carbon layer comprises one of a hydrogenated amorphous carbon silicon, germanium, $SiO_2$, $SiN_4$ and $TiO_2$.

15. A method of forming a reflective-type liquid crystal display comprising:

forming a first-type electrode;

forming a second-type electrode positioned opposite said first-type electrode and being of an opposite type than said first-type electrode;

forming a liquid crystal material between said first-type electrode and said second-type electrode; and forming an amorphous carbon-containing layer on at least one of said first-type electrode and said second-type electrode adjacent said liquid crystal material, wherein said amorphous carbon-containing layer is formed to provide a level of conductivity corresponding to a resistivity between 104 and $10^{11}$ ohms-cm.

16. The method in claim 15, wherein said forming of said first-type electrode comprises forming a transmissive-type electrode and said forming of said second-type electrode comprises forming a reflective-type electrode.

17. The method in claim 15, wherein method includes forming said amorphous carbon-containing layer to have a unidirectional orientation matched to said liquid crystal material.

18. The method in claim 15, further comprising forming one of a polyimide layer, polyamide layer and oblique-evaporated inorganic layer between said amorphous carbon-containing layer and said liquid crystal material.

19. The method in claim 15, wherein a voltage between said first-type electrode and said reflective electrode varies a transparency of said liquid crystal material.

20. A method of forming a reflective-type liquid crystal display comprising:

forming a first-type electrode;

forming a second-type electrode positioned opposite said first-type electrode and being of an opposite type than said first-type electrode;

forming a liquid crystal material between said first-type electrode and said second-type electrode; and forming an amorphous carbon-containing layer on at least one of said first-type electrode and said second-type electrode adjacent said liquid crystal material, wherein said amorphous carbon-containing layer is formed to provide a level of conductivity corresponding to a resistivity between $10^4$ and $10^{11}$ ohms-cm, and wherein said forming of said amorphous carbon-containing layer comprises forming one of a hydrogenated amorphous carbon silicon, germanium, $SiO_2Si_3N_4$ and $TiO_2$ layer.

* * * * *